Patented Nov. 21, 1933

1,936,547

UNITED STATES PATENT OFFICE 1,936,547

NITROGEN CONTAINING COMPOUNDS OF THE PYRIDINE AND QUINOLINE SERIES

Max Bockmühl, Walter Krohs, and Gustav Ehrhart, Frankfort-on-the-Main, Germany, assignors to Winthrop Chemical Company, Inc., New York, N. Y., a corporation of New York No Drawing. Application July 15, 1932, Serial No. 622,821, and in Germany April 20, 1931

6 Claims. (Cl. 260—42)

The present invention relates to nitrogen-containing compounds, more particularly to compounds of the following general formula

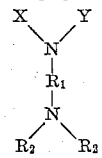

in which X stands for hydrogen and Y for a pyridyl or X and Y together stand for two carbon atoms of a pyridine or quinoline radical containing an imino group in alpha position, $R_1$ stands for the radical of an aliphatic hydrocarbon, $R_2$ stands for a cyclohexyl or hexahydrobenzyl radical.

We have found that compounds of the above constitution are obtained by transforming secondary amino compounds of the following general formula

wherein R stands consistently for a hydroaromatic or a hydroaromatic-aliphatic radical, by exchanging their imine-hydrogen for a basic radical, into compounds containing several nitrogen atoms in which the introduced nitrogen atom or atoms is or are bound by means of an aliphatic, cyclic or alicyclic radical to the imino group of the said compounds, or by converting intermediate products derived from these compounds by substitution of the imine hydrogen, into such compounds containing several nitrogen atoms.

These substances can be produced, for instance, by causing a compound of the formula

to react with a halogen-alkyl-amine, which may be used in the form of the free base or in the form of a salt. The new compounds can also be prepared from the compounds of the formula

in other ways, for instance, by converting them by means of a halogen hydrin or an alkylene dihalide into their N-hydroxyalkyl- or N-halogenalkyl compounds and causing the latter to react with a suitable basic compound containing a reactive group.

The new compounds are valuable therapeutic substances. In the form of the free bases, they constitute compounds which are difficultly soluble in water or insoluble in water and form hydrochlorides which are soluble in water.

The following examples illustrate the invention, the parts being by weight:

1. 1-dicyclohexylaminoethylpyridine-2-imide:

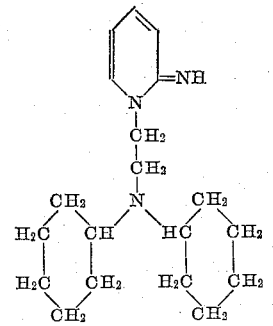

By treating dicyclohexylamine at 150° C. with ethylene-chlorhydrin, the β-dicyclohexylaminoethanol is obtained; it boils at 145° C. to 150° C. under 4 mm. pressure. 100 parts of β-dicyclohexylaminoethanol are slowly mixed in 500 parts of chloroform with 60 parts of thionyl chloride, the chloroform and the excess of thionyl chloride are removed by distillation and the residue is dissolved in ethyl acetate. The hydrochloride of β-dicyclohexylaminoethyl chloride crystallizes out. The free base is obtained from the aqueous solution of the hydrochloride by addition of caustic soda solution, and extraction with ether.

12 parts of β-dicyclohexylaminoethyl chloride, 5 parts of 2-aminopyridine and 5 parts of acetone are heated for 15 minutes on the steam bath. After cooling, the mass is mixed with 50 parts of acetone; the monohydrochloride of the new compound separates. It is filtered by suction and transformed by means of alcoholic hydrochloric acid into the dihydrochloride which, when recrystallized from a mixture of ethyl alcohol and acetone, melts at 230° C.

2. 1-dicyclohexylaminoethylquinoline-2-imide:

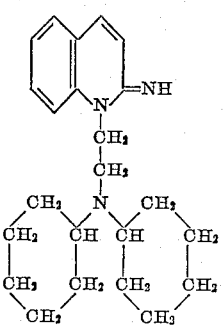

12 parts of β-dicyclohexylaminoethyl chloride and 8 parts of 2-aminoquinoline are heated for 1 hour on the steam bath. After cooling the hydrochloride of the new base is separated by means of acetone; it is recrystallized from alcohol and melts at 241° C.

3. 2-dicyclohexylaminoethylaminopyridine:

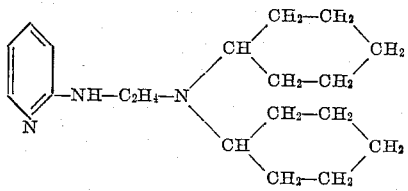

20 parts of aminopyridine, 200 parts of toluene and 8 parts of sodamide are heated for 1½ hour on the steam bath while stirring. 36 parts of β-dicyclohexylaminoethyl chloride are then added and the whole is heated for a further hour on the steam bath. After cooling the mass is mixed with water and the toluene is separated; the new base which is obtained by drying and distilling the toluene, is purified in a vacuum. It boils at 190° C. to 195° C. under 2 mm. pressure and yields a dihydrobromide melting at 198° C.

4. 1-dihexahydrobenzylaminoethylpyridine-2-imide:

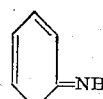
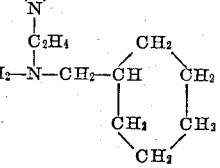

By reducing the hexahydrobenzonitrile, there is obtained besides hexahydrobenzylamine, the dihexahydrobenzylamine which boils at 115° C. to 120° C. under 3 mm. pressure. By treating the latter with ethylene-chlorhydrin, the β-dihexylhydrobenzylaminoethyl chloride is obtained which boils at 153° C. to 159° C. under 4 mm. pressure. By treating it with thionyl chloride, the β-dihexahydrobenzylaminoethyl chloride is obtained.

13 parts of β-dihexahydrobenzylaminoethyl chloride and 5 parts of 2-aminopyridine are heated for 1 hour on the steam bath. After cooling the mass is mixed with acetone; the monohydrochloride of the new base is filtered by suction and transformed by means of alcoholic hydrochloric acid into the dihydrochloride melting at 236° C.

5. 1-(1'-dicyclohexylaminopentyl-4'-)-pyridine-2-imide:

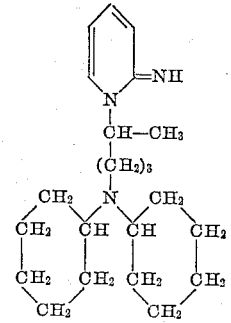

39 parts of sodium are dissolved in 600 parts of absolute alcohol and 500 parts of acetic acid ester are added, while cooling. 415 parts of beta-dicyclohexylaminoethyl chloride are introduced at 40° C. into this solution; after the introduction is complete, the temperature is kept for 2 hours at 80° C. After cooling, the mass is mixed with hydrochloric acid until the reaction is acid to Congo paper; the excess of acetic acid ester is removed by distillation with steam. The residue in the flask is slowly boiled for 24 hours with 400 parts of glacial acetic acid. After mixing with a concentrated solution of potassium carbonate, the 1-dicyclohexylaminopentanone-4 is dissolved in ether and purified by distillation under reduced pressure. It boils at 158° C. to 165° C. under 2 mm. pressure. It is transformed preferably at 100° C. and under a pressure of 50 atmospheres with hydrogen and in the presence of a nickel catalyst into the 1-dicyclohexylaminopentanol-4 which boils at 167° C. to 173° C. under 5 mm. pressure. By treating it in a benzene solution with thionyl chloride, the 1-dicyclohexylaminopentyl-chloride-4 is obtained.

42 parts of 1-dicyclohexylaminopentylchloride-4 and 20 parts of 2-aminopyridine are heated for 1 hour on the steam bath. After cooling the mass is mixed with ether, while stirring, the ether is separated from the oily substance produced which is mixed with acetone. The monohydrochloride of the 1-(1'-dicyclohexylaminopentyl-4'-)-pyridine-2-imide crystallizes out; when treated with alcoholic hydrochloric acid, it forms a dihydrochloride melting at 233° C.

6. di-para-methylcyclohexylaminoethylpyridine-2-imide:

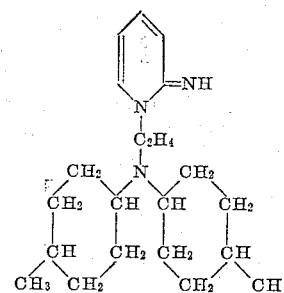

Para-methylcyclohexylbromide is caused to react with aminoethanol in the presence of potassium carbonate by heating them for 5 hours at 160° C., whereupon the di-para-methylcyclohexylaminoethanol is obtained which boils at 105° C. under 5 mm. pressure. When treated with thionyl chloride in benzene, it yields the di-para-methylcyclohexylaminoethylchloride.

10 parts of di-para-methylcyclohexylaminoethylchloride and 4 parts of 2-aminopyridine are heated for ½ hour on the steam bath. By addition of acetone the monohydrochloride of the di-para-methylcyclohexylaminoethylpyridine-2-imide is precipitated; when treated with alcoholic hydrochloric acid, it forms a dihydrochloride which melts at 256° C.

7. 1-dicyclohexylaminoethyl-5-oxypyridine-2-imide:

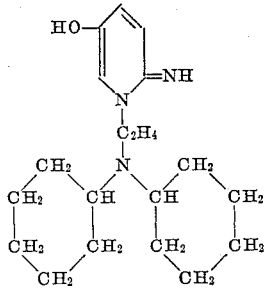

14 parts of β-dicyclohexylaminoethylchloride and 7 parts of 2-amino-5-hydroxypyridine are heated for ½ hour on the steam bath. The melt is dissolved in a small quantity of alcohol and the alcoholic solution is mixed with acetone. The monohydrochloride of the 1-dicyclohexylaminoethyl-5-hydroxypyridine-2-imide crystallizes out. The dihydrochloride melts at 232° C.

8. 1-dicyclohexylaminoethyl-5-ethoxypyridine-2-imide:

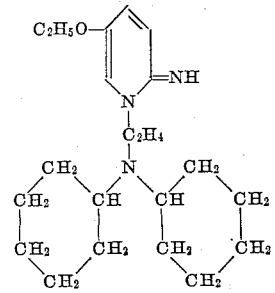

4 parts of 2-amino-5-ethoxypyridine and 7 parts of β-dicyclohexylaminoethylchloride are heated on the steam bath. After a vivid reaction, the melt solidifies. It is dissolved in a small quantity of alcohol. After mixing with acetone, the monohydrochloride of the 1-dicyclohexylaminoethyl-5-ethoxypyridine-2-imide separates. When treated with alcoholic hydrochloric acid, it yields a dihydrochloride which melts at 208° C.

We claim:
1. The dihydrohalides of the compounds of the following general formula:

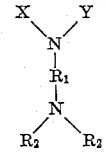

in which X stands for hydrogen and Y for α pyridyl or X and Y together stand for two carbon atoms of a pyridine or quinoline radical containing an imino group in alpha-position, $R_1$ stands for the radical of an aliphatic hydrocarbon, $R_2$ stands for a cyclohexyl or hexahydrobenzyl radical, said compounds being valuable therapeutic substances, soluble in water.

2. The dihydrohalides of the compounds of the following general formula:

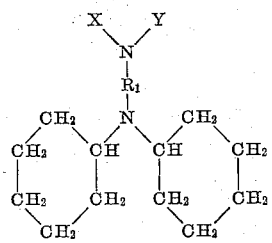

in which X stands for hydrogen and Y for α pyridyl or X and Y together stand for two carbon atoms of a pyridine radical containing an imino group in alpha-position, $R_1$ stands for the radical of an aliphatic hydrocarbon, said compounds being valuable therapeutic substances, soluble in water.

3. The dihydrohalides of the compounds of the following general formula:

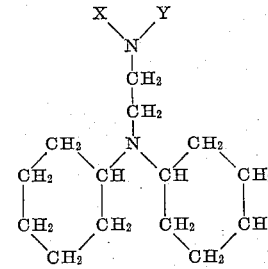

in which X stands for hydrogen and Y for α pyridyl or X and Y together stand for two carbon atoms of a pyridine radical containing an imino group in alpha-position said compounds being valuable therapeutic substances, soluble in water.

4. The dihydrochloride of the compound of the following formula:

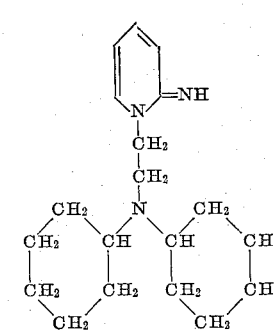

said compound being soluble in water and melting at 230° C.

5. The dihydrobromide of the compound of the following formula:

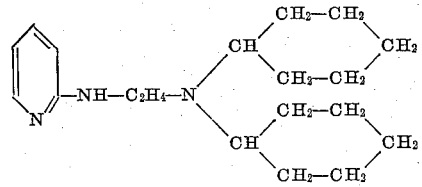

being soluble in water and melting at 198° C.

6. The dihydrochloride of the compound of the following formula:
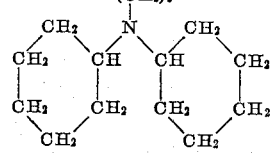
said compound being soluble in water and melting at 233° C.
MAX BOCKMÜHL.
WALTER KROHS.
GUSTAV EHRHART.